United States Patent
Stewart et al.

(10) Patent No.: US 10,547,939 B1
(45) Date of Patent: Jan. 28, 2020

(54) PICKUP RANGE CONTROL

(71) Applicant: Lenovo (Singapore) Pte. Ltd., Singapore (SG)

(72) Inventors: Aaron Michael Stewart, Raleigh, NC (US); Jonathan Jen-Wei Yu, Raleigh, NC (US); Jeffrey E. Skinner, Raleigh, NC (US); Lincoln Penn Hancock, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/131,582

(22) Filed: Sep. 14, 2018

(51) Int. Cl.
*H04R 3/00* (2006.01)
*G06F 3/0488* (2013.01)
*G06F 3/16* (2006.01)

(52) U.S. Cl.
CPC ........... *H04R 3/00* (2013.01); *G06F 3/04883* (2013.01); *G06F 3/165* (2013.01); *G06F 3/167* (2013.01)

(58) Field of Classification Search
CPC ....... H04R 3/00; G06F 3/04883; G06F 3/165; G06F 3/167
See application file for complete search history.

(56) References Cited

U.S. PATENT DOCUMENTS

| | | | | |
|---|---|---|---|---|
| 6,073,033 A | * | 6/2000 | Campo | H04M 1/05 348/14.02 |
| 2012/0053942 A1 | * | 3/2012 | Minamino | G10L 15/32 704/251 |
| 2014/0115491 A1 | * | 4/2014 | Cullin | G06F 3/0233 715/745 |
| 2018/0213073 A1 | * | 7/2018 | Jiang | H04M 1/19 |

* cited by examiner

*Primary Examiner* — Regina N Holder
(74) *Attorney, Agent, or Firm* — Ference & Associates LLC

(57) ABSTRACT

One embodiment provides a method, including: receiving, at an information handling device, an indication to adjust a pickup range of a microphone of the information handling device; determining, using a processor, a magnitude by which to adjust the pickup range; and adjusting the pickup range based on the determined magnitude. Other aspects are described and claimed.

18 Claims, 3 Drawing Sheets ary material is included in at least one
PICKUP RANGE CONTROL

BACKGROUND

Information handling devices ("devices"), for example smart phones, tablet devices, smart speakers, laptop and personal computers, and the like, may be capable of receiving and processing audible user command inputs. To provide audible input, a user must generally interact with a voice input module operatively coupled to the device, for example embodied in a digital assistant through the use of natural language. The quality and clarity of the audible input received by the digital assistant must be good so that the digital assistant may perform a user-desired function.

BRIEF SUMMARY

In summary, one aspect provides a method, comprising: receiving, at an information handling device, an indication to adjust a pickup range of a microphone of the information handling device; determining, using a processor, a magnitude by which to adjust the pickup range; and adjusting the pickup range based on the determined magnitude.

Another aspect provides an information handling device, comprising: a processor; a memory device that stores instructions executable by the processor to: receive an indication to adjust a pickup range of a microphone of the information handling device; determine a magnitude by which to adjust the pickup range; and adjust the pickup range based on the determined magnitude.

A further aspect provides a product, comprising: a storage device that stores code, the code being executable by a processor and comprising: code that receives an indication to adjust a pickup range of a microphone; code that determines a magnitude by which to adjust the pickup range; and code that adjusts the pickup range based on the determined magnitude.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
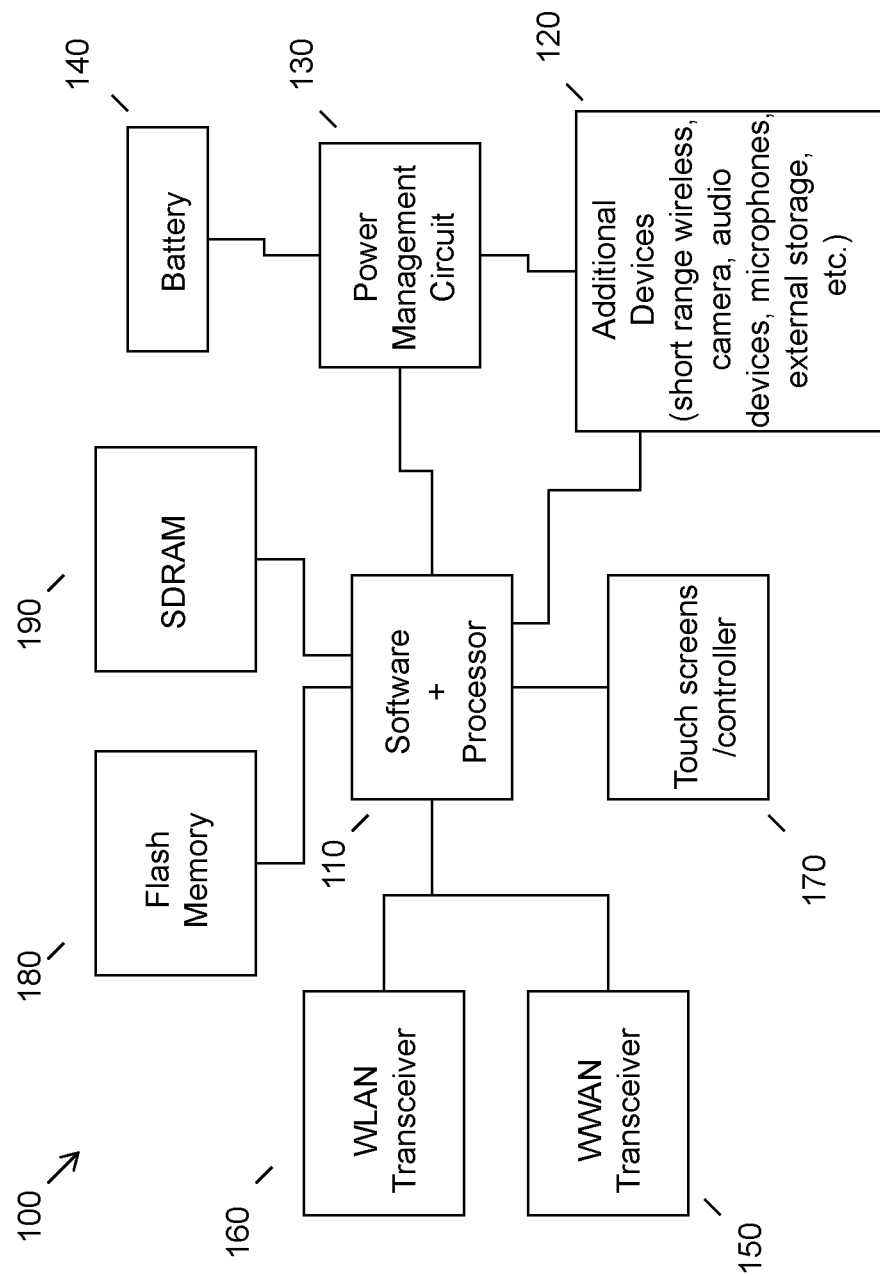
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Users frequently utilize devices to execute a variety of different types of commands or queries. One method of interacting with a device is to use digital assistant software employed on the device. Digital assistants are able to perform actions that are responsive to a variety of different types of user commands (e.g., voice commands, etc.) that are provided to an input device (e.g., microphone, etc.) operatively or integrally coupled to the device.

As the number of devices with active digital assistants proliferates and as end-users carry digital assistant-enabled devices to more places, there will naturally be a greater need to more granularly control the effective pickup range associated with the digital assistant so as to prevent cross-talk. More particularly, voice input commands must be clear enough so that the digital assistant can effectively recognize and process the intended command. In situations with a great deal of audible noise (e.g., public locations, crowded locations, loud locations, etc.) the audible command may be contaminated with outside noise (e.g., ambient noise from the environment, conversations and input provided by other individuals, etc.), which may decrease the ability of the digital assistant to effectively process the command.

Currently, end-users of devices with voice-enabled digital assistants have no direct method of controlling the pickup range for these input devices nor are they able to be apprised of the current range of audible pickup. For instance, if a user desired for a digital assistant to only listen for commands within a short range of the device, there is currently no control & feedback mechanism to provide this. A situation in which such a mechanism may be useful is when multiple individuals each have a digital assistant-enabled device in a communal space. In this situation, a user may wish to throttle the pickup range of their input device to a more private range so as to prevent the audible input provided by the other individuals to interfere with, or contaminate, the user's command input. However, conventional techniques for improving the quality of the audible input provided to an input device largely require a user to either adjust their body position or relocate to a different location, which is burdensome.

Accordingly, an embodiment provides a method for adjusting a pickup range of an input device associated with a digital assistant by a determined magnitude. In an embodiment, an indication to adjust a pickup range for an input device may be received by the device. The indication may be a user-provided indication (e.g., identified by explicit user adjustment input), a dynamically determined indication (e.g., via intelligently determining that the pickup range should be adjusted based upon a contextual characteristic of the device, etc.), and the like. An embodiment may then determine a magnitude by which to adjust the pickup range and thereafter adjust the pickup range based upon the determined magnitude. Such a method may improve the clarity and effectiveness of audible command inputs, especially those that are provided in crowded and/or loud settings.

Such a method may therefore inform a user that a non-personal device has recognized a user's identity and is capable of performing user-specific functions and/or loading user-specific settings.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes one or more touch screens 170 for data input and display/rendering. System 100 also typically includes various memory devices, for example flash memory 180 and SDRAM 190.

Figure 2:
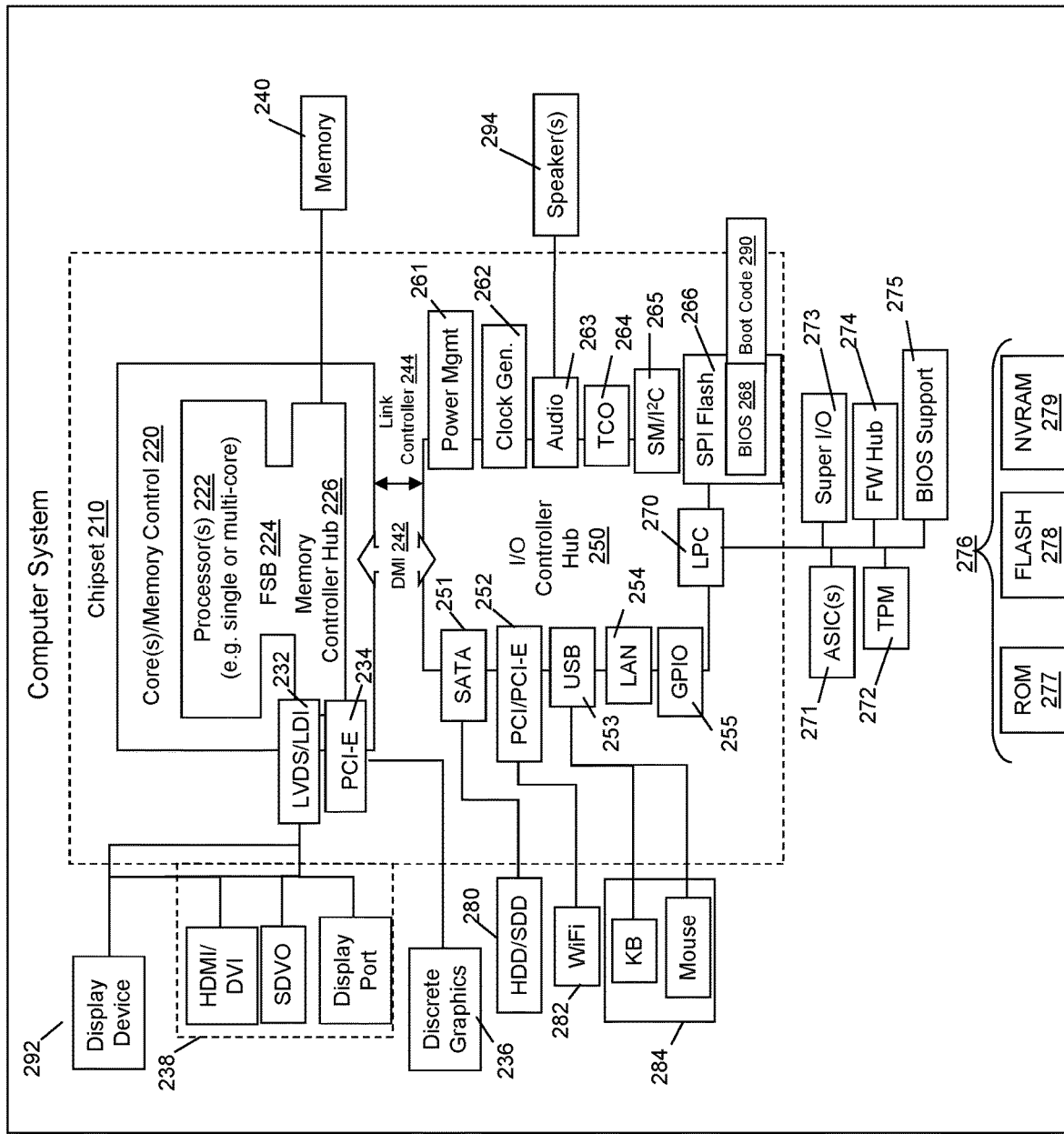
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, smart speakers, personal computer devices generally, and/or electronic devices that are capable of supporting a digital assistant that may receive and process user inputs. For example, the circuitry outlined in FIG. 1 may be implemented in a tablet or smart phone embodiment, whereas the circuitry outlined in FIG. 2 may be implemented in a laptop embodiment.

Figure 3:
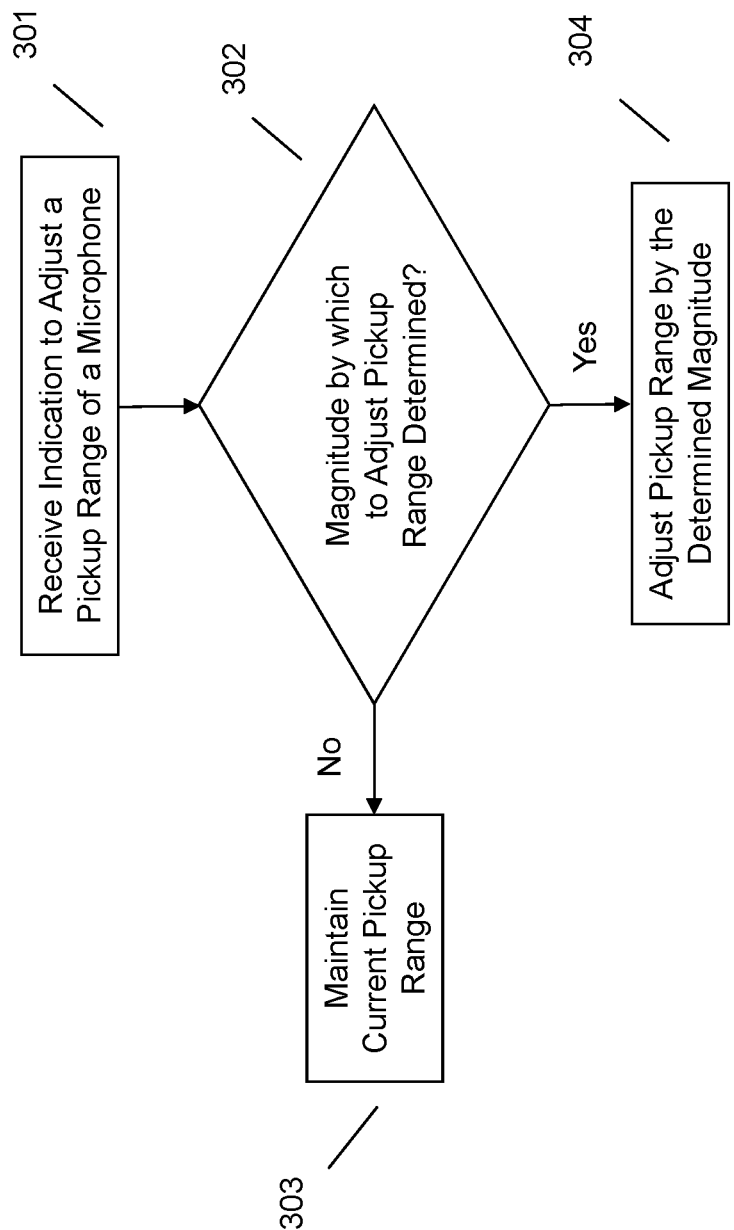
FIG. 3 illustrates an example method of adjusting the pickup range of a microphone.

Referring now to FIG. 3, an embodiment may adjust the pickup range of an input device by a determined magnitude. At 301, an embodiment may receive an indication to adjust a pickup range of an audible input device. For simplicity purposes, an audible input device in this application may correspond to one or more microphones integrally or operatively coupled to a device. However, this designation is not limiting and persons having ordinary skill in the art will recognize that other types of audible input devices may also be utilized. Additionally, in the context of this application, a pickup range may refer to the spatial range in which audio may be detected by a microphone.

In an embodiment, the received indication may originate from the receipt/detection of explicit user adjustment input provided to an input region of the information handling device. The input region may be any type of input device (e.g., touch input device, audible input device, gesture input device, etc.) capable of accepting and processing user input types (e.g., touch input, voice input, gesture input, etc.). For example, the input region of an embodiment may correspond to a touch input sensor (e.g., a touch input screen, etc.) that a user may interact with by providing touch inputs to. The touch input sensor may be accessible to the user in multiple configurations and power state of the device. For example, in some configurations, the touch input sensor may be resident on an outside cover of a device (e.g., resident on the A-cover of a laptop, on a top portion of a smart speaker, etc.) so that the device may receive user touch inputs even while the device is in a closed state (e.g., when the laptop screen is shut, when a device is in a passive state so that other functions of the device are deactivated, etc.). For simplicity purposes, the remaining discussion regarding user adjustment input will refer to adjustment input provided via touch input modalities to a touch input screen. However, this designation is not intended to be limiting and other input types and input devices may also be used.

In an embodiment, a user may provide user adjustment input by interacting with content displayed on a touch input screen. The touch input screen may be a capacitive display, a reflective display, another type of display, a combination thereof, and the like. The content may be virtually any content that may allow a user to convey a desired level of adjustment to a digital assistant. For example, a user may be able to select from one of a predetermined type of adjustment settings. More particularly, a device may present the user with three pickup range settings: Broad, Default, and Narrow. A user may select the pickup range setting that best suits their contextual situation. For example, if the user was in a crowded environment, they would likely select the Narrow setting so that the pickup range of a microphone is narrowed so that the chance of ambient noise interfering with a user's command is minimized. In another example that provides a user with a more granular level of adjustment, a user may interact with a slide bar that may allow them to broaden the pickup range by sliding the bar to the right (or up) and narrow the range by sliding the bar to the left (or down). Other types of touch-based adjustment configurations not listed here may also be utilized.

In an embodiment, user adjustment input may not just be provided to adjust the pickup range of a microphone of a device, but may be provided to adjust other aspects of the device. For example, a user may interact with the same or different touch input screen to turn on or mute the digital assistant, to adjust volume of the digital assistant output, to toggle among states and/or personalities of the digital assistant, and/or to command the device to perform one or more other actions.

In an embodiment, the received indication may not result from the receipt of explicit user adjustment input, but rather, may result from the intelligent detection of a contextual characteristic associated with the device. In an embodiment, the contextual characteristic may be associated with the number of individuals proximate to the device, a user's distance to the device, a location of the device, the level of sound associated with that location, another contextual metric, and the like. In an embodiment, the contextual characteristic may be determined using one or more sensors (e.g., cameras, microphones, other sensors, etc.) integrally or operatively coupled to the device. For example, a device may use a camera to take an image or video of a location and, via image analysis, may thereafter be able to determine the number of individuals in the location. As another example, a device may use a microphone to detect ambient audio levels and may thereafter determine whether the ambient audio is greater or less than a predetermined threshold. In another embodiment, the contextual characteristic may be determined using context data obtained from one or more other sources (e.g., location data obtained from a GPS device, user identity and/or presence data obtained from a calendar or social media invite, etc.). For example, an embodiment may determine that a user is in a public location, such as an airport, responsive to receiving GPS data that indicates so. As another example, an embodiment may access a user's calendar invites to identify the projected number of people that have confirmed attendance at a particular event.

At 302, an embodiment may determine a magnitude by which to adjust the pickup range. In the context of this application, the magnitude of adjustment may refer to an objective amount by which the pickup range may be either broadened or narrowed. In the case of receiving user adjustment input, the magnitude may be determined by the user adjustment input. For example, if a user interacts with a touchable slide control to narrow the range of microphone pickup from six units to two units, where six and two correspond to predefined pickup ranges, the magnitude of adjustment may be 4 units. In the case of detecting one or more contextual characteristics associated with the device, the magnitude may be determined by the contextual characteristic. An embodiment may refer to and access an accessible database (e.g., stored locally, externally, etc.) comprising a list of predetermined pickup values for each contextual characteristic. For example, an embodiment may dynamically the pickup range to 3 out of 10 responsive to detecting that ten other individuals are within proximity of a device. As another example, an embodiment may automatically adjust the pickup range to a predetermined setting based on the determined location. For instance, if an embodiment determines that the device is in an airport, the pickup range may be set to 1. Conversely, if an embodiment determines that the device is at a home location, the pickup range may be set to 8.

In an embodiment, a visual indication of the adjustment and/or current pickup range may be provided to the user. For example, an embodiment may comprise a strip region comprised of a plurality of lights (e.g., LED lights, display-based lights, etc.) arranged in a row. The strip region may correspond to the touch-sensitive region, may be located proximate to the touch-sensitive region, may be located in another position of the device or another device (e.g., a user's smart phone in communication with the device, etc.), and the like. If a user narrows the pickup range (e.g., by sliding their finger left on the strip or on the touch-sensitive region, etc.) then the number of lighted portions on the strip diminishes. An embodiment may also apprise a user of the pickup range level and/or adjustment by other means (e.g., an audible indication, etc.).

If a magnitude of adjustment is unable to be determined, at 302, then an embodiment may maintain, at 303, the current pickup range. Conversely, responsive to determining, at 302, a magnitude by which to adjust a pickup range of a microphone, an embodiment may, at 304, adjust the pickup range by the determined magnitude. In an embodiment, the adjusted pickup range may remain in effect until an indication is received to adjust it again. In another embodiment, the pickup range may be reset to a default pickup range each time a device is started or each time a user initiates an interaction with a device.

The various embodiments described herein thus represent a technical improvement to conventional pickup range adjustment techniques. Using the techniques described herein, an embodiment may receive an indication (e.g., a user-provided indication, an intelligently determined indication, etc.) to adjust a pickup range of an audible input device, such as a microphone. An embodiment may then determine a magnitude by which to adjust the pickup range and thereafter adjust the pickup range based upon the determined magnitude. An embodiment may also provide the user with a visual indication of the adjustment. Such a method may enable users to more effectively provide audible commands to a device by minimizing the risk of audio contamination during audible input provision.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
   receiving, at an information handling device, an indication to adjust a pickup range of a microphone of the information handling device, wherein the receiving the indication comprises detecting a contextual characteristic associated with the information handling device, the contextual characteristic being associated with an identified proximate individual number;
   determining, based on the identified proximate individual number, a magnitude by which to adjust the pickup range; and
   adjusting the pickup range based on the determined magnitude.

2. The method of claim 1, wherein the receiving the indication comprises receiving user adjustment input provided to an input device.

3. The method of claim 2, wherein the user adjustment input comprises input selected from the group consisting of: touch input, gesture input, and voice input.

4. The method of claim 2, wherein the input device is a touch input sensor resident on a cover of the information handling device.

5. The method of claim 2, wherein the magnitude is determined by the user adjustment input.

6. The method of claim 1, wherein the contextual characteristic includes at least one additional characteristic selected from the group consisting of user distance to the information handling device, information handling device location, and location volume.

7. The method of claim 1, wherein the magnitude is determined by the contextual characteristic and wherein the adjusting comprises automatically adjusting the pickup range without receiving user adjustment input.

8. The method of claim 1, wherein the receiving comprises receiving the indication when the information handling device is in any configuration state.

9. The method of claim 1, further comprising providing a visual indication of the adjusting.

10. An information handling device, comprising:
a processor;
a memory device that stores instructions executable by the processor to:
receive an indication to adjust a pickup range of a microphone of the information handling device, wherein the instructions executable by the processor to receive the indication comprise instructions executable by the processor to detect a contextual characteristic associated with the information handling device, the contextual characteristic being associated with an identified proximate individual number;
determine, based on the identified proximate individual number, a magnitude by which to adjust the pickup range; and
adjust the pickup range based on the determined magnitude.

11. The information handling device of claim 10, wherein the instructions executable by the processor to receive the indication comprise instructions executable by the processor to receive user adjustment input provided to an input device.

12. The information handling device of claim 11, wherein the user adjustment input comprises input selected from the group consisting of: touch input, gesture input, and voice input.

13. The information handling device of claim 11, wherein the input device is a touch input sensor resident on a cover of the information handling device.

14. The information handling device of claim 11, wherein the magnitude is determined by the user adjustment input.

15. The information handling device of claim 10, wherein the contextual characteristic includes at least one additional characteristic selected from the group consisting of user distance to the information handling device, information handling device location, and location volume.

16. The information handling device of claim 10, wherein the magnitude is determined by the contextual characteristic and wherein the instructions executable by the processor to adjust comprise instructions executable by the processor to automatically adjust the pickup range without receiving user adjustment input.

17. The information handling device of claim 10, wherein the instructions executable by the processor to receive comprise instructions executable by the processor to receive the indication when the information handling device is in any configuration state.

18. A product, comprising:
a storage device that stores code, the code being executable by a processor and comprising:
code that receives an indication to adjust a pickup range of a microphone, wherein the code that receives the indication comprises code that detects a contextual characteristic associated with the product, the contextual characteristic being associated with an identified proximate individual number;
code that determines, based on the identified proximate individual number, a magnitude by which to adjust the pickup range; and
code that adjusts the pickup range based on the determined magnitude.

* * * * *